United States Patent
Kim et al.

(10) Patent No.: US 9,531,861 B2
(45) Date of Patent: Dec. 27, 2016

(54) SMART PHONE HAVING EMERGENCY CALL BUTTON

(71) Applicant: Byung Chang Moon, Seoul (KR)

(72) Inventors: Seong Soo Kim, Seoul (KR); Han Seok Kim, Seoul (KR)

(73) Assignee: Byung Chang Moon, Seoul (KR)

( * ) Notice: Subject to any disclaimer, the term of this patent is extended or adjusted under 35 U.S.C. 154(b) by 0 days.

(21) Appl. No.: 14/429,225

(22) PCT Filed: Sep. 17, 2013

(86) PCT No.: PCT/KR2013/008442
§ 371 (c)(1),
(2) Date: Mar. 18, 2015

(87) PCT Pub. No.: WO2014/046479
PCT Pub. Date: Mar. 27, 2014

(65) Prior Publication Data
US 2015/0237192 A1    Aug. 20, 2015

(30) Foreign Application Priority Data
Sep. 20, 2012 (KR) .................. 10-2012-0104453

(51) Int. Cl.
| | |
|---|---|
| *H04M 11/04* | (2006.01) |
| *H04M 1/725* | (2006.01) |
| *H04W 76/00* | (2009.01) |
| *H04W 4/22* | (2009.01) |
| *H04M 3/42* | (2006.01) |
| *H04W 88/02* | (2009.01) |

(52) U.S. Cl.
CPC ..... *H04M 1/72541* (2013.01); *H04M 3/42221* (2013.01); *H04W 4/22* (2013.01); *H04W 76/007* (2013.01); *H04W 88/02* (2013.01)

(58) Field of Classification Search
CPC ............. H04M 1/72541; H04M 3/42221; H04W 76/007; H04W 4/22; H04W 88/02
USPC .................................... 455/404.1
See application file for complete search history.

(56) References Cited

U.S. PATENT DOCUMENTS 7,920,891 B2    4/2011  Kwak
8,249,547 B1 *  8/2012  Fellner .............. G08B 21/0446
                                                    455/404.1
(Continued)

FOREIGN PATENT DOCUMENTS

JP    2003-217060 A    7/2003
JP    2004-040339 A    2/2004
(Continued)

*Primary Examiner* — Juan A Torres
(74) *Attorney, Agent, or Firm* — Rabin & Berdo, P.C.

(57) ABSTRACT

A smart phone having an emergency call button includes an emergency button which is provided on a rear surface of the smart phone so as not to protrude from the rear surface and has a touch detection unit disposed on the rear surface of the smart phone to detect a touch signal according to manipulation of a user, and a decompression detection unit disposed on a lower portion of the touch detection unit to detect a decompression signal according to the manipulation of the user, and an emergency call transmission unit which transmits preset emergency rescue request information to a guardian terminal and an agency server.

4 Claims, 4 Drawing Sheets

(56) References Cited

U.S. PATENT DOCUMENTS

| | | | |
|---|---|---|---|
| 2004/0229564 A1* | 11/2004 | Huang | G01S 19/03 |
| | | | 455/41.2 |
| 2005/0248453 A1 | 11/2005 | Fechter | |
| 2009/0082065 A1 | 3/2009 | Kwak | |
| 2012/0052836 A1* | 3/2012 | Buratti | H04M 1/72541 |
| | | | 455/404.2 |
| 2013/0005295 A1 | 1/2013 | Park et al. | |

FOREIGN PATENT DOCUMENTS

| | | |
|---|---|---|
| JP | 2004-080717 A | 3/2004 |
| JP | 2005-354382 A | 12/2005 |
| JP | 2008-015859 A | 1/2008 |
| JP | 2008-046971 A | 2/2008 |
| JP | 2009-033313 A | 2/2009 |
| JP | 2011-035887 A | 2/2011 |
| JP | 2011-504312 A | 2/2011 |
| JP | 2012-176631 A | 9/2012 |
| KR | 10-2005-0087954 A | 9/2005 |
| KR | 10-2006-0026806 A | 3/2006 |
| KR | 10-2008-0036974 A | 4/2008 |
| KR | 10-0827709 B1 | 5/2008 |
| KR | 10-2010-0068368 A | 6/2010 |
| KR | 10-2010-0110203 A | 10/2010 |
| KR | 10-2011-0004706 A | 1/2011 |
| KR | 10-2011-0066404 A | 6/2011 |
| KR | 10-1358354 B1 | 2/2014 |

* cited by examiner

SMART PHONE HAVING EMERGENCY CALL BUTTON

CROSS-REFERENCE TO RELATED APPLICATION

The present application claims priority of Korean Patent Application No. 10-2012-0104453, filed on Sep. 20, 2012, which is incorporated herein by reference.

TECHNICAL FIELD

The present disclosure relates to a smart phone having an emergency call button, and more particularly, to a technology of transmitting emergency information to a preset guardian terminal and an agency server when a smart phone user touches and depresses an emergency button provided on a rear surface of a smart phone in case of emergency, and simultaneously recording a voice of a criminal coming from the scene of an accident.

BACKGROUND ART

In recent years, mobile communication devices have been recognized as most popularized necessities due to the explosive increase in mobile communication subscribers. Thus, mobile communication device manufacturers release mobile communication devices with high performance and various functions in the market. In line with this trend, communication service providers provide higher level communication services and several supplementary services.

For example, there have been recently released a mobile communication terminal having a rescue request function, in which the 122 app is downloaded on the mobile communication terminal, and then the 112 app is executed to request for rescue to an agency, such as a police station, in case of emergency, and a mobile communication system thereof.

However, because one has to take out the terminal from a his/her pocket or bag, and tap it 3 or 4 times or more than while checking the screen in order to request for rescue by use of the terminal applied by the technology, there is a problem in that it becomes unusable in case of emergency, for example, when a user is standing face to face with criminal.

There have been developed various studies to solve such a problem, and, for example, one is disclosed in Korean Patent No. 10-0827709, entitled "Urgent Call Misappropriation Preventing System and Method Using Wireless Communications."

With reference to FIG. 1, the system disclosed in Korean Patent No. 10-0827709 includes a rescue requester device having an urgent rescue key for a requester's urgent situation; a communication company server configured to receive the urgent situation from the rescue requester device and establish a call between the rescue requester device and a rescuer device, in which when the urgent situation is transferred from the rescuer device to a security server, the communication company server switches the call to a call between the rescue requester device and the security server, and transmits a telephone number of the rescue requester and short message information to the rescuer device; a rescuer device configured to inform the urgent situation based on the telephone number of the rescue requester device and the short message information; and a security server configured to connect the rescue requester device and a secondary emergency contact point (e.g., a police station or a fire station) in a one-way reception state through the communication company server.

However, there is a problem in that emergency situations were erroneously sent due to touch malfunction or erroneous manipulation of mobile communication devices in a situation in which the user does not want in spite of himself or herself. In order to solve such a problem, a method of depressing a plurality of buttons or other methods are applied.

Depressing the plurality of buttons in case of emergency is not possible in reality, and thus the user can hardly operate the buttons in the bag or pocket.

In addition, the other technology is disclosed in Korean Patent Application No. 10-2012-0094841, entitled "Smart Phone having Urgent Call Button," but does not disclose a configuration of recording conversation content between the user and the criminal and sending to the mobile communication company.

Accordingly, in case where 78% of sexual violence is involved an offender who is a family member, intimate partner, friend, or acquaintance, it is possible to prevent or suppress the crime by recording the voice coming from the scene of an accident. Therefore, there is required a technology of recording the voice coming from the scene of the accident and sending it to the mobile communication company server.

DISCLOSURE

Technical Problem

The present invention has been made to solve the above problems, and an object of the present invention to provide a technology in which when an emergency situation occurs, a smart phone user touches and depresses a single emergency button provided on a rear surface of a smart phone, instead of depressing a plurality of buttons, to transmit emergency information to a preset guardian terminal and a agency server, and simultaneously record a voice of a criminal coming from the scene of an accident, thereby promoting the touching and depressing of the emergency button while preventing the user from panicking in the emergency situation.

Also, another object of the present invention is to provide a technology in which the emergency button is engraved on the rear surface of the smart phone so as to insert the emergency button into the inside of a case, thereby minimizing friction or interference according to normal use of the smart phone In addition, further another object of the present invention is to provide a technology in which the emergency information is transmitted to the preset guardian terminal and agency server as soon as the user depresses a button-type camera provided on the rear surface of the smart phone, thereby transmitting the emergency situation without the need for an additional button.

Technical Solution

In order to achieve the above technical problems, a smart phone having an emergency call button according to the present invention includes an emergency button which is engraved on a rear surface of the smart phone so as not to protrude from the rear surface and has a touch detection unit provided on the rear surface of the smart phone to detect a touch signal according to manipulation of a user, and a depression detection unit provided on a lower portion of the touch detection unit to detect a depression signal according to the manipulation of the user; and an emergency call transmission unit which, when the touch signal and the depression signal are received from the emergency button, transmits preset emergency rescue request information to a guardian terminal and an agency server and records a voice coming from the scene of an accident in real time and transmits the live recording information to a mobile communication company server.

Advantageous Effects

According to the present invention as described above, when the emergency situation occurs, the smart phone user touches and depresses the single emergency button provided on the rear surface of the smart phone, instead of depressing a plurality of buttons, to transmit the emergency information to the preset guardian terminal and the agency server, and simultaneously record the voice of a criminal coming from the scene of the accident, thereby promoting the touching and depressing of the emergency button while preventing the user from panicking in the emergency situation.

Also, according to the present invention, the emergency button is engraved on the rear surface of the smart phone so as to insert the emergency button into the inside of a case, thereby minimizing friction or interference according to normal use of the smart phone.

In addition, according to the present invention, the emergency information is transmitted to the preset guardian terminal and agency server as soon as the user depresses a button-type camera provided on the rear surface of the smart phone, thereby transmitting the emergency situation without the need for an additional button.

In particular, in view of the fact in that 78% of sexual violence is involved an offender who is a family member, intimate partner, friend, or acquaintance, it is possible to effectively prevent or suppress the crime by recording the voice coming from the scene of the accident.

BRIEF DESCRIPTION OF REFERENCE NUMERALS

Figure 1:
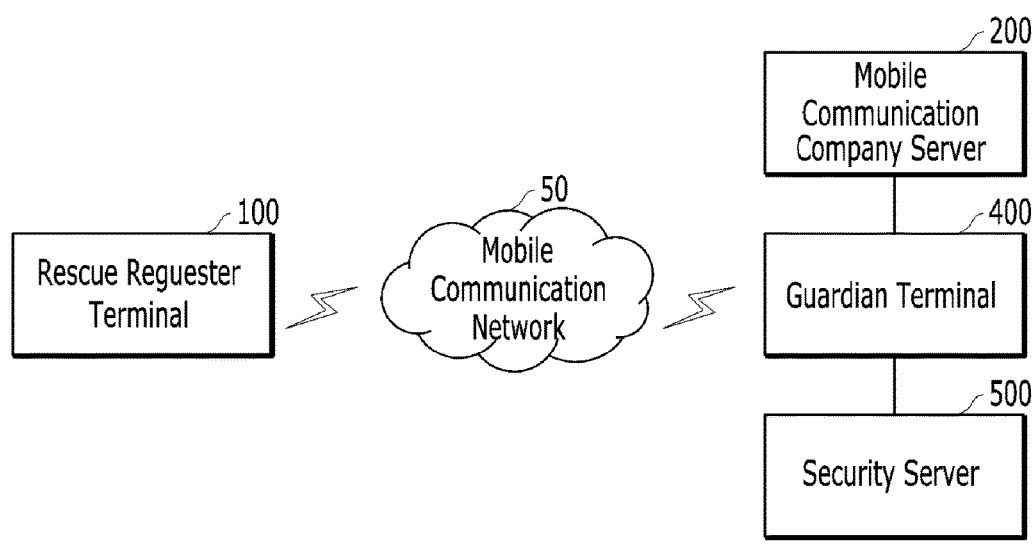
FIG. 1 is view illustrating an urgent call misappropriation preventing system and method using wireless communications according to the related art.

100: Smart phone having emergency call button
110: Emergency button
111: Touch detection unit
112: Depression touch unit
113: Human body detection sensor
120: Emergency call transmission unit
10: Guardian terminal
20: Agency server
30: Mobile communication company server
C: Camera
K: Home key Mode for Invention Hereafter, exemplary embodiments of the present invention will be described in detail with reference to the accompanying drawings. While certain embodiments have been described, these embodiments have been presented by way of example only, and are not intended to limit the scope of the inventions. Indeed, the novel smart phone described herein may be embodied in a variety of other forms; furthermore, various omissions, substitutions and changes in the form of the smart phone described herein may be made without departing from the spirit of the inventions. The accompanying claims and their equivalents are intended to cover such forms or modifications as would fall within the scope and spirit of the inventions.

Figure 2:
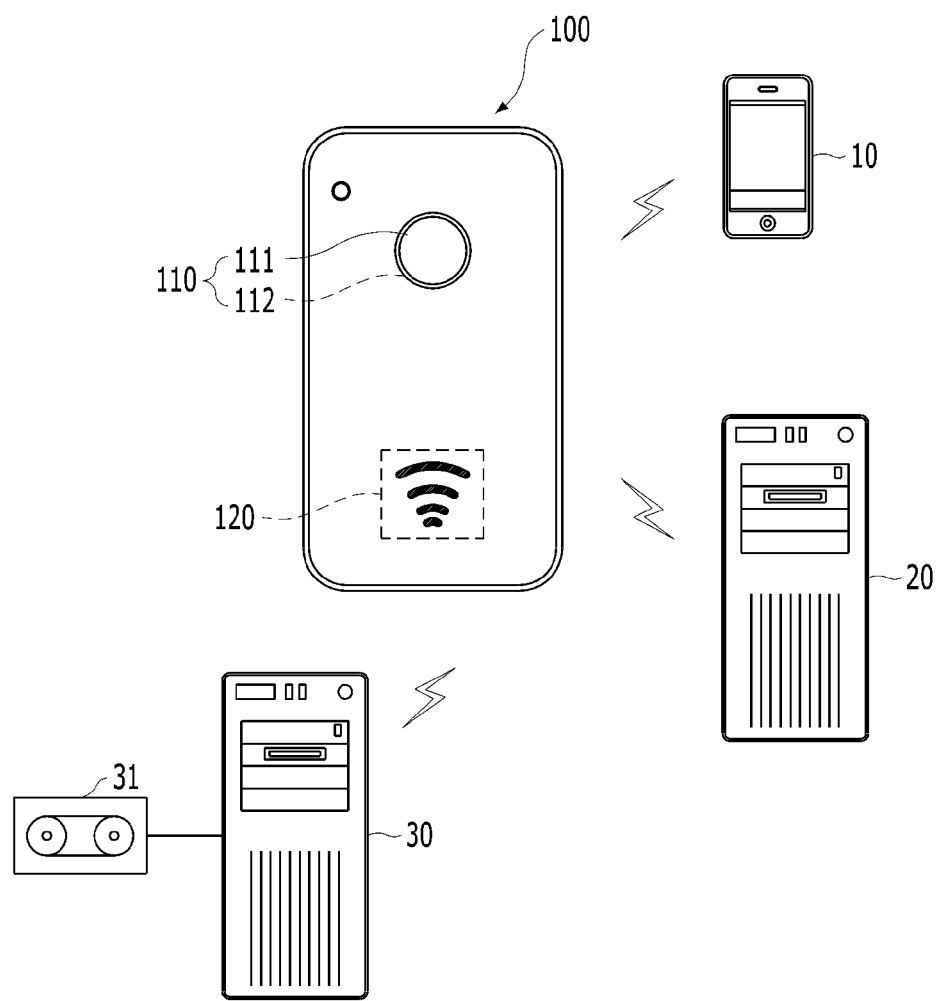
FIG. 2 is view illustrating a smart phone having an emergency call button according to the present invention.

As illustrated in FIG. 2, a smart phone 100 having an emergency call button according to the present invention includes an emergency button 110 and an emergency call transmission unit 120 which are provided on a rear surface of the smart phone to detect a touch signal according to manipulation of a user, thereby creating recording information containing conversation contents and transmitting the recording information on the scene of the accident to a mobile communication company server 30 which is managed by a recording information managing unit 31, and simultaneously transmitting preset emergency rescue request information to a guardian terminal 10 and an agency server 20.

The smart phone 100 according to the present invention may be a communication appliance including an internet phone capable of being connected to the Internet, as well as having a telephone call function, and a tablet PC.

Figure 3A:
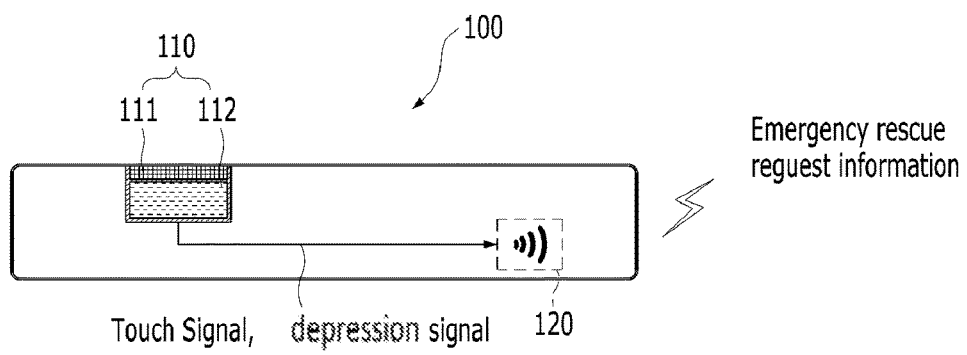
FIG. 3a is a cross-sectional view illustrating a detailed configuration of a smart phone having an emergency call button according to an embodiment of the present invention.
Figure 3B:
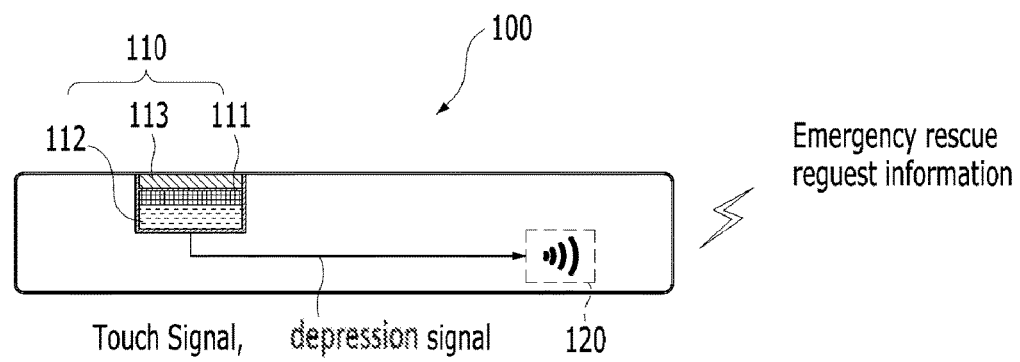
FIG. 3b is a cross-sectional view illustrating a detailed configuration of a smart phone having an emergency call button and a human body detection sensor according to an embodiment of the present invention.

With reference to FIGS. 3a and 3b, the configuration of the smart phone 100 having the emergency call button according to an embodiment of the present invention will be described in detail.

The emergency button 110 is engraved on the rear surface of the smart phone so as not to protrude from the rear surface, and includes a touch detection unit 111 provided on the rear surface of the smart phone to detect a touch signal according to manipulation of a user, and a depression detection unit 112 provided on a lower portion of the touch detection unit 111 to detect a depression signal according to the manipulation of the user.

Specifically, the touch detection unit 111 of the emergency button 110 detects the touch according to the manipulation of the user through a capacitive sensing method, and applies the generated touch signal to the emergency call transmission unit 120 when the touch detection unit is touched for a preset time.

Also, after the touch detection unit 111 generates the touch signal, the depression detection unit 112 of the emergency button 110 detects the depression according to the manipulation of the user. The depression detection unit 112 applies the generated depression signal to the emergency call transmission unit 120 when the depression detection unit is depressed for a preset time.

Herein, the preset time may be 2 seconds to 4 seconds, but the present invention is not limited thereto.

In addition, as illustrated in FIG. 3b, the emergency button 110 according to the present invention may further include a human body detection sensor 113. When the human body detection sensor 113 directly touches a human body of the user, the human body detection sensor 113 controls that the touch detection unit 111 is activated to generate the touch signal.

If the emergency call transmission unit 120 is received by the touch signal and the depression signal from the emergency button 110, the emergency call transmission unit 120 transmits the preset emergency rescue request information to the guardian terminal 10 and the agency server 20, and simultaneously records the voice coming from the scene of the accident in real time to transmit the recording information to the mobile communication company server 30.

The mobile communication company server 30 may further include a recording information managing unit 31 which stores and manages the recording information received from the smart phone 100 in real time, and transmits the stored recording information to the agency server 20 when the agency server 20 requests.

Herein, the emergency rescue request information may include a smart phone identification number, a guardian terminal identification number, and financial service stop request information having an account number and a credit card identification number which are stored in a storing portion (inner or outer memory) of the smart phone.

This is to prevent a financial accident of the user in advance by transmitting the financial service stop request information to the guardian terminal 10 or the agency server 20 in case of emergency.

Figure 4:
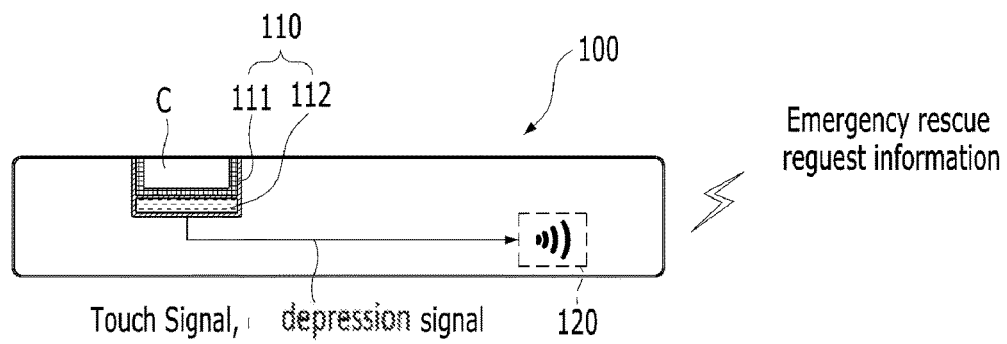
FIG. 4 is a cross-sectional view illustrating a detailed configuration of a smart phone having an emergency call button according to another embodiment of the present invention.

With reference to FIG. 4, the smart phone 100 having the emergency call button according to another embodiment of the present invention will be described.

The emergency button 110 according to another embodiment includes a camera C of a button type integrally provided on the rear surface of the smart phone 100, in which the touch detection unit 111 formed to enclose the camera C detects the touch signal according to the manipulation of the user, and the depression detection unit 112 provided on a bottom surface of the camera detects the depression signal applied from a front surface of the camera C to the bottom surface according to the manipulation of the user.

If the emergency call transmission unit 120 is received by the touch signal and the depression signal from the emergency button 110, the emergency call transmission unit 120 transmits the preset emergency rescue request information to the guardian terminal 10 and the agency server 20, and simultaneously records the voice coming from the scene of the accident in real time to transmit the recording information to the mobile communication company server 30.

Figure 5:
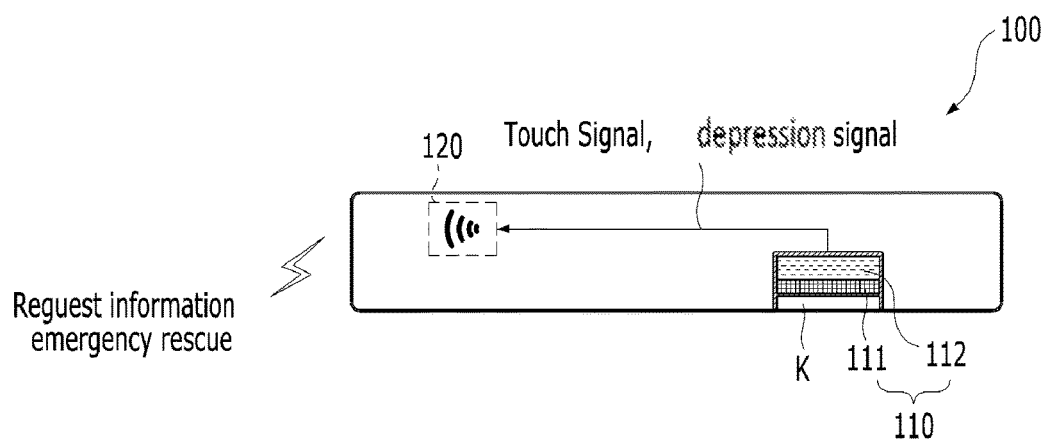
FIG. 5 is a cross-sectional view illustrating a detailed configuration of a smart phone having an emergency call button according to further another embodiment of the present invention.

With reference to FIG. 5, the smart phone 100 having the emergency call button according to another embodiment of the present invention will be described.

The emergency button 110 according to another embodiment includes a home key K of a button type integrally provided on the smart phone 100, in which the touch detection unit 111 formed on the home key K detects the touch signal according to the manipulation of the user, and the depression detection unit 112 provided on a bottom surface of the home key K detects the depression signal applied from a front surface of the home key K to the bottom surface according to the manipulation of the user.

If the emergency call transmission unit 120 is received by the touch signal and the depression signal from the emergency button 110, the emergency call transmission unit 120 transmits the preset emergency rescue request information to the guardian terminal 10 and the agency server 20, and simultaneously records the voice coming from the scene of the accident in real time to transmit the recording information to the mobile communication company server 30.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the inventive as defined by the appended claims and equivalents thereof.

What is claimed is:

1. A smart phone having an emergency call button, comprising:
    an emergency button provided in a rear side of the smart phone, the emergency button including
        a depression detection unit disposed in a bottom side of the emergency button and configured to generate a depression signal according to manipulation of a user,
        a touch detection unit disposed on the depression detection unit such that a lower portion of the touch detection unit physically contacts an upper portion of the depression detection unit, and configured to detect a touch signal according to manipulation of the user, and
        a human body detection sensor disposed on the touch detection unit such that a lower portion of the human body detection sensor contacts an upper portion of the touch detection unit, the human body detection sensor activating the touch detection unit when the human body detection sensor is directly touched by a body of the user; and
    an emergency call transmission unit electrically connected to the emergency button and transmitting preset emergency rescue request information, when the touch signal and the depression signal are received from the emergency button, to a guardian terminal and an agency server.

2. The smart phone having the emergency call button according to claim 1, wherein the emergency button detects the touch signal through a capacitive sensing method, and applies the touch signal to the emergency call transmission unit when the touch detection unit is touched for a preset time; and
    the depression detection unit detects the depression signal after the touch detection unit generates the touch signal, and applies the depression signal to the emergency call transmission unit when the depression detection unit is depressed for a preset time.

3. The smart phone having the emergency call button according to claim 1, wherein the emergency rescue request information includes a smart phone identification number, a guardian terminal identification number, and financial service stop request information having an account number and a credit card identification number which are stored in a storing portion of the smart phone.

4. The smart phone having the emergency call button according to claim 1, wherein the emergency button further includes a camera of a button type integrally provided on the rear surface of the smart phone (100).

* * * * *